S. Leach.
Churn.
Nº 90,758. Patented Nov. 1, 1869.
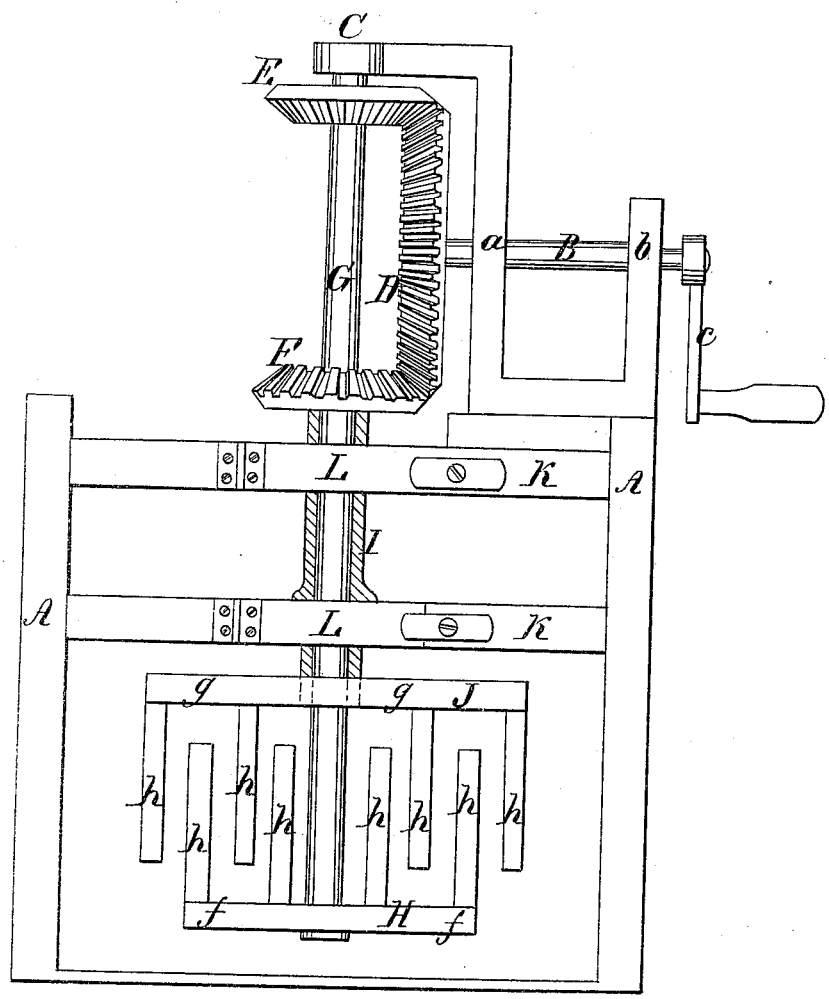
Witnesses
C. B. Newell
J. A. Bolen
Inventor
Surrebus Leach
By his attys
Gardner & Hyde

United States Patent Office.

SURVETUS LEACH, OF WILBRAHAM, MASSACHUSETTS.

Letters Patent No. 90,758, dated June 1, 1869.

IMPROVEMENT IN CHURNS.

The Schedule referred to in these Letters Patent and making part of the same.

*To all whom it may concern:*

Be it known that I, SURVETUS LEACH, of Wilbraham, Hampden county, Commonwealth of Massachusetts, have invented certain new and useful Improvements in Churns; and I do hereby declare that the following is a full and exact description thereof, reference being had to the accompanying drawings, and to the letters of reference marked thereon.

The drawings show a side view of my churn, with a portion of it represented in section.

This invention consists in so arranging a churn that it will break up the milk or cream, and collect the portions forming the butter in the shortest time, and in the most thorough manner.

In construction, I form my churn of a frame, A, having a shaft, B, working in bearings $a$ and $b$ at the top and side.

This shaft has a crank, C, on the outside end, and a bevelled gear-wheel, D, on the other, which operates two smaller gear-wheels, E and F, the one E being placed at the top, and attached to a vertical shaft, G, having a dasher, H, at the bottom, and working in bearings $c$ at the top of the frame.

The gear F is placed at the lower side of the wheel D, and is attached to a sleeve, I, around the shaft G.

This sleeve is shown in the drawings as if sectioned vertically its length, and has attached to it, at its bottom end, a dasher, J.

The sleeve I works in bearings formed in cross-bars K K, and guides the lower part of the shaft G.

The dashers H and J are formed with horizontal arms, $f f'$ and $g g'$, which extend on each side of their shafts.

From these arms extend vertically teeth $h h h$, which fit in between each other when both dashers are on the same vertical plane, the arms $f f'$, upon the shaft G, being at the bottom, with their teeth extending upward, and the arms $g g'$ above, with their teeth extending downward.

The shafts G and I can be taken out of their bearings by means of the hinged pieces L L' upon the bars K K, forming one side of the bearings of the sleeve I. This is done in order to place the vessel holding the cream under the frame, and then insert the dashers.

The operation of this device is as follows:

The vessel containing the cream is placed under the frame. The dashers are then inserted, the shafts being set in their bearings, and fastened in. The crank is turned, revolving the gear-wheel D, which turns the smaller wheels E and F, the one, E, revolving the shaft G, and with it the lower dasher, in one direction, while the wheel F turns the sleeve I and upper dasher in the other, the teeth $h h h$ on the different dashers revolving in circles of different diameters, and thoroughly breaking up the cream.

The gear-wheel D being made much larger than the ones E and F, a proportionately-increased speed can be obtained upon the dashers over that required in the crank.

By this means, I obtain a quick, thorough, and effective method of churning, using a simple mechanical arrangement, which can be constructed with very little expense, and, as the dashers of the churn work in different directions, the butyraceous particles are more completely collected, and a greater proportion of butter obtained from the amount of cream.

My device can also be applied to any vessel which has sufficient width to take in the dasher, and is small enough to go under the frame.

Now, having described my invention,

What I claim as new, and desire to secure by Letters Patent, is—

The construction and arrangement of the frame A, cross-pieces K and K, hinged pieces L and L', and forming bearings for the shaft I, when used in combination with the arrangement of shafts G and I and dashers H and J, herein described and shown.

Witnesses:            SURVETUS LEACH.
EDWARD H. HYDE,
R. F. HYDE.